Sept. 13, 1960
G. O. MATTER
2,952,392
MEASURING DISPENSER
Filed March 5, 1957
2 Sheets-Sheet 1
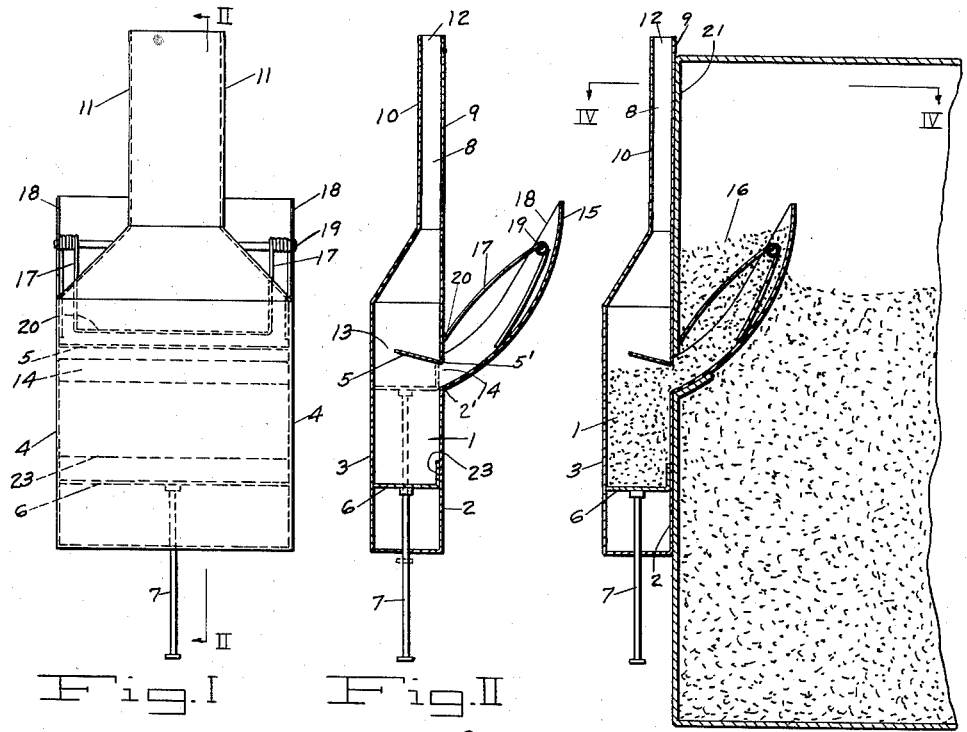
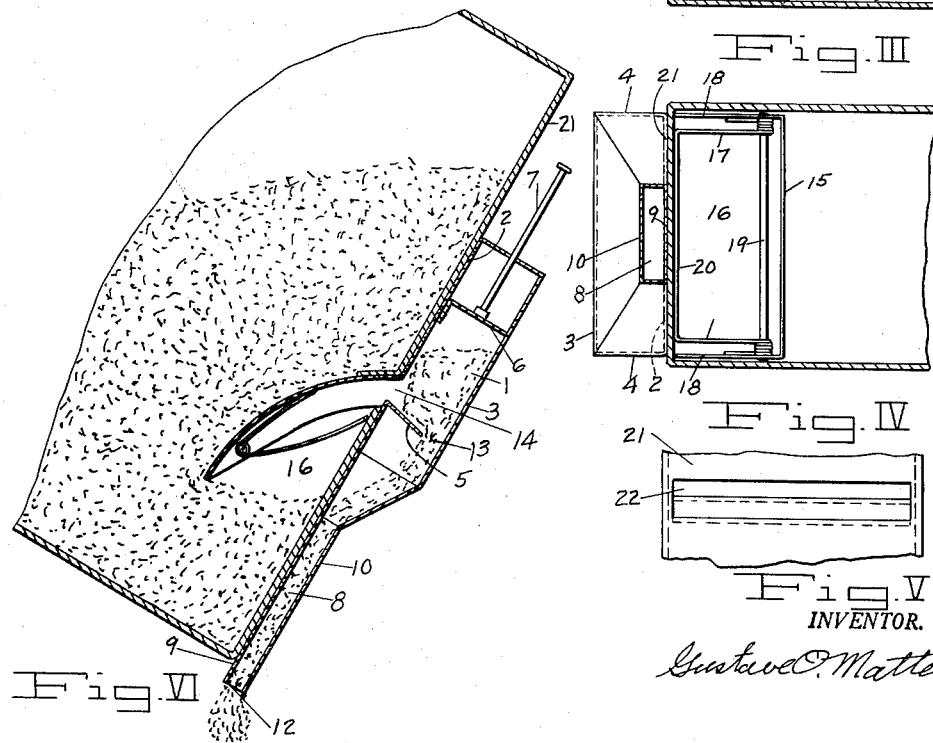
INVENTOR.
Gustave O. Matter Sept. 13, 1960    G. O. MATTER    2,952,392
MEASURING DISPENSER
Filed March 5, 1957    2 Sheets-Sheet 2
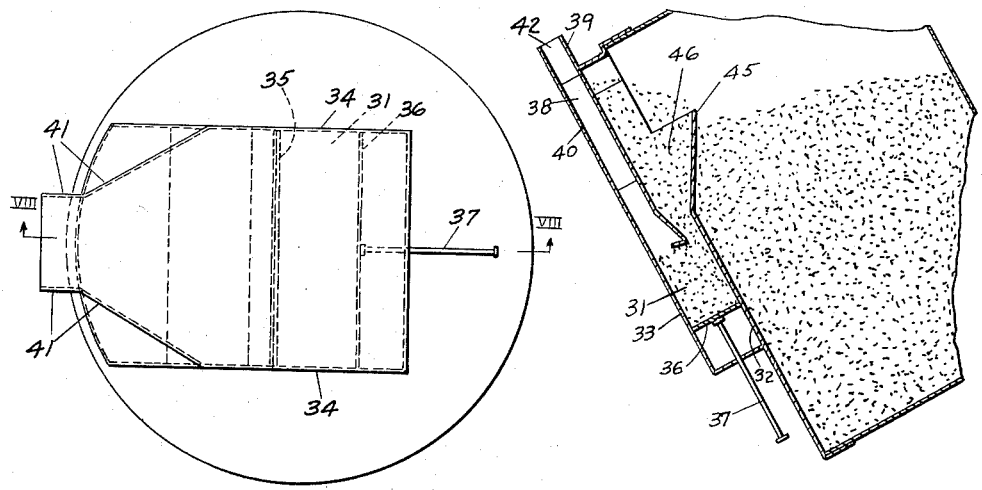
Fig. VII
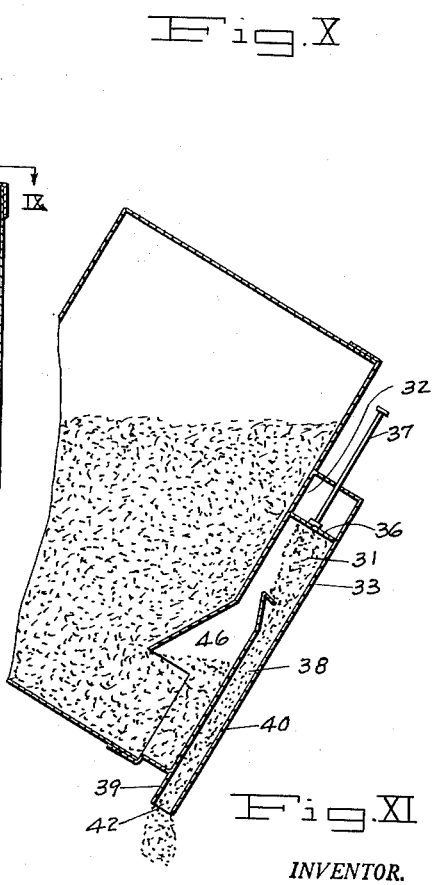
Fig. X
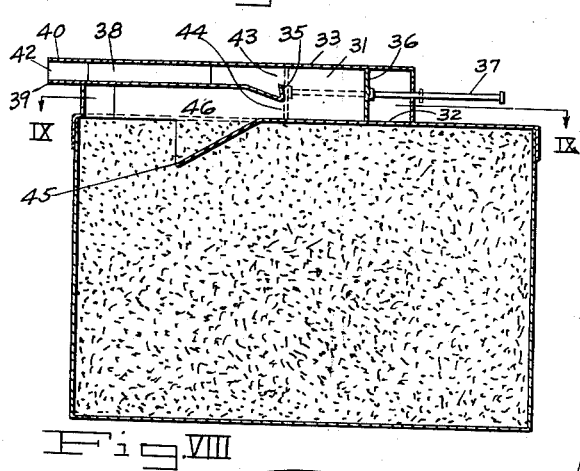
Fig. VIII
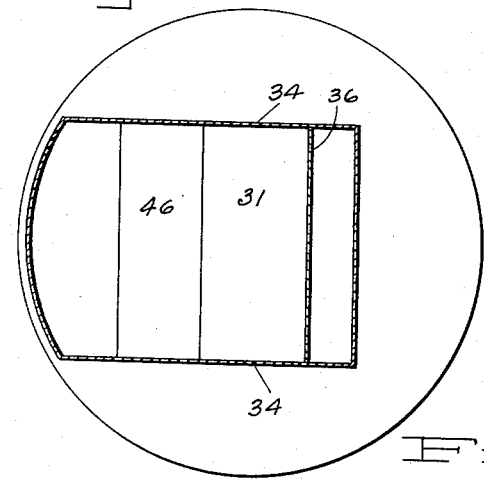
Fig. IX
Fig. XI
INVENTOR.
Gustave O. Matter

United States Patent Office 2,952,392
Patented Sept. 13, 1960

2,952,392
MEASURING DISPENSER
Gustave O. Matter, 3112 NE. 46th Ave., Portland, Oreg.

Filed Mar. 5, 1957, Ser. No. 644,063

10 Claims. (Cl. 222—440)

My invention relates to measuring dispensers of the type adapted to dispense a measured amount of a free-flowing substance, including granulated and powdered substance, from a container.

An object of this invention is a dispenser which prevents direct flow of contents from the inside to the outside of its container.

Another object is a dispenser which regulates the amount of substance dispensed from its container.

Another object is a dispenser wherein direct flow of a substance from its container is interrupted.

Another object is a dispenser which permits a predetermined amount of granulated or powdered substance to flow from its container.

Another object is a dispenser which allows a measured amount of substance to flow from its container.

Another object is a dispenser which can be easily attached to a container and which will be held firmly in place on the container, preventing leakage of substance from the container between the dispenser and the container.

Another object is a dispenser for a container wherein the dispenser is operative on a full container.

Another object is a dispenser wherein the amount of substance to be dispensed from a container can be easily regulated.

Another object is a dispenser which permits the flow of contents from the container to be completely shut off.

Further objects and advantages of the invention will appear in and from the following specification considered in connection with the accompanying drawings, which are for purpose of illustration and not intended as a definition of the invention, the invention being defined in the appended claims.

Referring to the drawings, in which like characters of reference indicate corresponding parts throughout the several views:

Fig. I is a front elevation of one form of the dispenser.

Fig. II is a vertical section on line II—II of Fig. I.

Fig. III is a vertical section of the dispenser and a portion of a container to which the dispenser is shown attached, in normally upright position.

Fig. IV is a section on line IV—IV of Fig. III.

Fig. V is a left hand elevation of a portion of the container shown in Fig. III, showing the opening made in the container for attachment of the dispenser.

Fig. VI is a vertical section similar to that shown in Fig. III but shown in an inverted position.

Fig. VII is a top plan view of a modified form of dispenser and its container.

Fig. VIII is a vertical section on line VIII—VIII of Fig. VII and shown in normally upright position.

Fig. IX is a section on line IX—IX of Fig. VIII.

Fig. X is a section similar to Fig. VIII but shown in position to allow the measuring compartment of the dispenser to become filled with contents from the container.

Fig. XI is a section similar to Fig. X but shown in an inverted position to allow the contents in the measuring compartment to gravitate therefrom.

Referring to the numerals on the drawing, as shown in Figs. I–IV inclusive, the dispenser has a measuring compartment 1 which is defined by back wall 2, front wall 3, side walls 4, top wall 5, and bottom wall 6 which is made slidable within the measuring compartment walls 2, 3 and 4 as by stem 7 which is attached to the lower wall 6.

A spout providing an outlet channel 8 is formed by channel back wall 9, which is above measuring compartment back wall 2 and on the same plane therewith, front wall 10 and side walls 11, outlet channel 8 extends upward from measuring compartment top wall 5 to a channel outlet 12.

Measuring compartment top wall 5 has its inner edge spaced from measuring compartment front wall 3 to form a measuring compartment outlet passageway 13 which leads to outlet channel 8 and channel outlet 12.

The outlet channel back wall 9 is substantially perpendicular to and joined with the outer edge of measuring compartment top wall 5, the junction 5' of the two walls 9 and 5 forming the upper side of a measuring compartment inlet passageway 14, the lower side of inlet passageway 14 is spaced downward from the juncture 5' of walls 9 and 5 and is formed by the juncture 2' of measuring compartment back wall 2 and a guide plate 15.

The guide plate 15 extends outward and upward from its juncture with measuring compartment back wall 2 to a spaced relationship from outlet channel back wall 9 to form a supply compartment 16 between channel back wall 9 and guide plate 15.

A resilient clamping member 17, which is mounted on guide plate side walls 18 as by pin 19, has a crossbar 20 adapted to hold the channel back wall 9 and the measuring compartment back wall 2 against wall 21 of a container to which the dispenser has been attached.

The dispenser is made attachable to a container as by inserting the guide plate 15 with its side walls 18 and clamping member 17 with its crossbar 20 through opening 22 in the container wall 21, in doing so the resilient clamping member 17 with its crossbar 20 is forced down toward guide plate 15 by contact with the top edge of opening 22 in the container wall 21, after the crossbar 20 of the resilient clamping member 17 has entered the container it clamps the wall 21 of the container to the outlet channel back wall 9 and against the measuring compartment back wall 2 of the dispenser.

The measuring compartment lower wall 6 is provided with an upturned edge 23 adjacent measuring compartment back wall 2 and is adapted to shut off communication from supply compartment 16 through inlet passageway 14 to measuring compartment 1 as shown in dotted outline in Fig. II.

In operation, with the container and the attached dispenser in normal upright position, as shown in Fig. III, a portion of the contents in the container is retained in the supply compartment 16 between the wall 21 of the container and the guide plate 15 and some of the contents gravitate from supply compartment 16 by way of guide plate 15 through inlet passageway 14 and into measuring compartment 1 until measuring compartment 1 is filled.

When the container with its dispenser is inverted to a position similar to that shown in Fig. VI, only the contents in the measuring compartment 1 will gravitate through outlet passageway 13 into outlet channel 8 and out channel outlet 12.

The measuring compartment outlet passageway 13 being narrower than the measuring compartment 1 prevents the measuring compartment 1 from becoming overfilled with contents from the container.

As shown in Figs. VII–XI inclusive, the dispenser is made a part of the cover of a container and the dispenser has a measuring compartment 31 which is defined by back wall 32, front wall 33, side walls 34, top wall 35, and lower wall 36 which is made slidable within the walls 32, 33 and 34 as by stem 37 which is attached to lower wall 36.

An outlet channel 38 is formed by channel back wall 39 which is substantially perpendicular to and joined with the outer edge of measuring compartment top wall 35, channel front wall 40 which is an upward extended continuation of measuring compartment front wall 33, and side walls 41. Outlet channel 38 extends upward from measuring compartment top wall 35 to a channel outlet 42.

The measuring compartment top wall 35 has its inner edge spaced from measuring compartment front wall 33 to form a measuring compartment outlet passageway 43 which leads to outlet channel 38 and channel outlet 42. The outer edge of measuring compartment top wall 35 is spaced from measuring compartment back wall 32 to form a measuring compartment inlet passageway 44 between the outer edge of top wall 35 and measuring compartment back wall 32.

A guide plate 45 is joined to measuring compartment back wall 32 above measuring compartment inlet passageway 44 and extends outward and upward therefrom to form a supply compartment 46 between channel back wall 39 and guide plate 45.

The measuring compartment lower wall 36 is adapted to shut off communication into and out of measuring compartment 31 by way of inlet passageway 44 and outlet passageway 43 respectively as shown in dotted outline in Fig. VIII.

In operation, when the container and dispenser are in position with channel outlet 42 substantially in an upward position as shown in Fig. X, a portion of the contents in the container is retained in the supply compartment 46 between the outlet channel back wall 39 and guide plate 45 and some of the contents gravitate from the supply compartment 46 to and through inlet passageway 44 and into measuring compartment 31 until measuring compartment 31 is filled.

When the container with its dispenser is inverted with the channel outlet 42 substantially in a downward position, as shown in Fig. XI, only the contents in the measuring compartment 31 will gravitate through outlet passageway 43 into outlet channel 38 and out channel outlet 42.

The measuring compartment outlet passageway 43 and inlet passageway 44 being narrower than the measuring compartment 31 prevents the measuring compartment 31 from becoming over-filled with contents from the container.

While the specification sets forth in detail the construction of the device, deviation from the construction shown may be resorted to without departing from the spirit of the invention as defined in the appended claims.

In view of the foregoing description, taken in conjunction with the accompanying drawings, it is deemed that a clear understanding of the invention will be apparent to those skilled in the art. Therefore a more detailed description is accordingly thought unnecessary.

Having described the invention, what is claimed as new is:

1. A measuring dispenser for attachment to a receptacle over an opening thereof, said dispenser comprising an elongate body having top, bottom, side, front and back walls defining at one end of the body a measuring compartment, said back wall terminating at one end adjacent to the bottom edge of an inlet passageway leading into the measuring compartment and adapted for communication with the opening of the receptacle, said top wall extending from the opposite and top edge of said passageway toward and terminating short of said front wall to provide a measuring compartment outlet passageway, a guide plate joined to the back wall at the said bottom edge of the inlet passageway and extending obliquely outwardly from the outer side of the back wall and in a direction away from said bottom wall, said guide plate only by reason of its lateral extension from the outer side of the back wall being adapted to project into the receptacle through the said receptacle opening when the dispenser is in operative position on the receptacle over and with said inlet passageway in communication with the said opening, and means forming an elongate outlet channel extending longitudinally of the body from said outlet passageway.

2. A measuring dispenser for attachment to a side of a receptacle over an opening therein, said dispenser comprising an elongate body having a longitudinal extension of one end in the form of a material outlet channel, the body through a portion of the opposite end in longitudinal alignment with said extension being formed to provide a measuring compartment having a bottom wall, a top wall and front and back walls, there being a measuring compartment outlet passageway leading into the material outlet channel across said top wall, there being a measuring compartment inlet passageway opening transversely of and through the back wall of the measuring compartment, and a material guiding plate joined to the back wall on the side of the measuring compartment inlet passageway nearest to said bottom wall and projecting obliquely outwardly from the back wall away from said compartment and away from said bottom wall, the said guiding plate being adapted to extend into the receptacle through the said opening in the latter when the body is positioned to lie along an outer side of the receptacle, with said inlet passageway in communication with said opening.

3. The invention according to claim 2, wherein said measuring compartment outlet passageway is formed by the top wall extending from the back wall toward and terminating short of the front wall.

4. The invention according to claim 2, with means for detachably securing the dispenser on the receptacle.

5. The invention according to claim 2, wherein said bottom wall is movable in the material measuring compartment with respect to said material inlet and outlet passageways, one side edge of the movable bottom wall moving in a plane extending across the material inlet passageway.

6. The invention according to claim 4, wherein the securing means comprises a resilient element positioned between the said material guiding plate and the adjacent side of the said material outlet channel and said resilient element being adapted to frictionally engage an inner surface of the receptacle wall to which the dispenser is attached when the guiding plate is extended through said opening.

7. The combination of a receptacle having a flat wall provided with an opening, and a measuring dispenser, the measuring dispenser comprising an elongate body having a longitudinal portion of one end in the form of a spout providing a material outlet channel, the elongate body being formed through a portion of the opposite end to provide a material measuring compartment having a back wall, a front wall, side walls, and a bottom wall, there being a measuring compartment outlet passageway leading into the material outlet channel, said material outlet channel forming spout including a back wall which is in the same plane as and continuous with the material measuring compartment back wall, said back walls lying against said flat wall of the receptacle, there being a material measuring compartment inlet passageway leading through the material measuring compartment back wall and aligning with the opening in the receptacle wall, and a material guiding plate joined to the material measuring compartment back wall on the side of the material measuring compartment inlet passageway nearest to said bottom wall and projecting through the receptacle wall opening obliquely of the receptacle wall and in a direction away from said bottom wall.

8. The combination of a receptacle having an open side, a cover adapted to be secured over said open side and a measuring dispenser, the measuring dispenser comprising an elongate body having a longitudinal portion of one end formed to provide a material measuring compartment of which a portion of said cover forms a back wall, said material measuring compartment further having side walls, a front wall and a bottom wall, a spout forming a material outlet channel, there being a material outlet passageway leading from said material measuring compartment into the material outlet channel, said spout forming the outlet channel extending substantially parallel with said material measuring compartment back wall, the spout having a back wall terminating at said material outlet passageway, there being a material inlet passageway for the material measuring compartment adjacent to said outlet passageway, and a material guiding plate joined to the material measuring compartment back wall at one side of said inlet passageway and projecting obliquely from the inner side of the material measuring compartment back wall and extending in a direction away from the material measuring compartment bottom wall.

9. The invention according to claim 8, wherein said bottom wall is movable in the material measuring compartment with respect to said material inlet and outlet passageways.

10. A measuring dispenser for attachment to a side of a receptacle over an opening therein, said dispenser comprising an elongate body having a longitudinal extension of one end in the form of a material outlet channel, the body through a portion of the opposite end in longitudinal alignment with said extension being formed to provide a measuring compartment having a bottom wall, a top wall and front and back walls, there being a measuring compartment outlet passageway leading into the material outlet channel across said top wall, there being a measuring compartment inlet passageway opening transversely of and through the back wall of the measuring compartment, and a material guiding plate joined to the back wall on the side of the measuring compartment inlet passageway nearest to said bottom wall and projecting obliquely outwardly from the back wall away from said compartment and away from said bottom wall, the said guiding plate being adapted to extend into the receptacle through the said opening in the latter when the body is positioned to lie along an outer side of the receptacle, with said inlet passageway in communication with said opening, and means for detachably securing the dispenser on the receptacle, said securing means comprising a cover for the receptacle to which cover the dispenser is attached and said cover having a peripheral flange and the said back wall consisting of a portion of said cover.

References Cited in the file of this patent
UNITED STATES PATENTS

| 1,199,507 | Strauss | Sept. 26, 1916 |
| 1,799,401 | Yancey | Apr. 7, 1931 |
| 2,006,019 | Holesworth | June 25, 1935 |
| 2,010,126 | Akers | Aug. 6, 1935 |
| 2,800,257 | Nixon | July 23, 1957 |

FOREIGN PATENTS

| 593,704 | Germany | Aug. 20, 1934 |